United States Patent Office 3,304,132
Patented Feb. 14, 1967

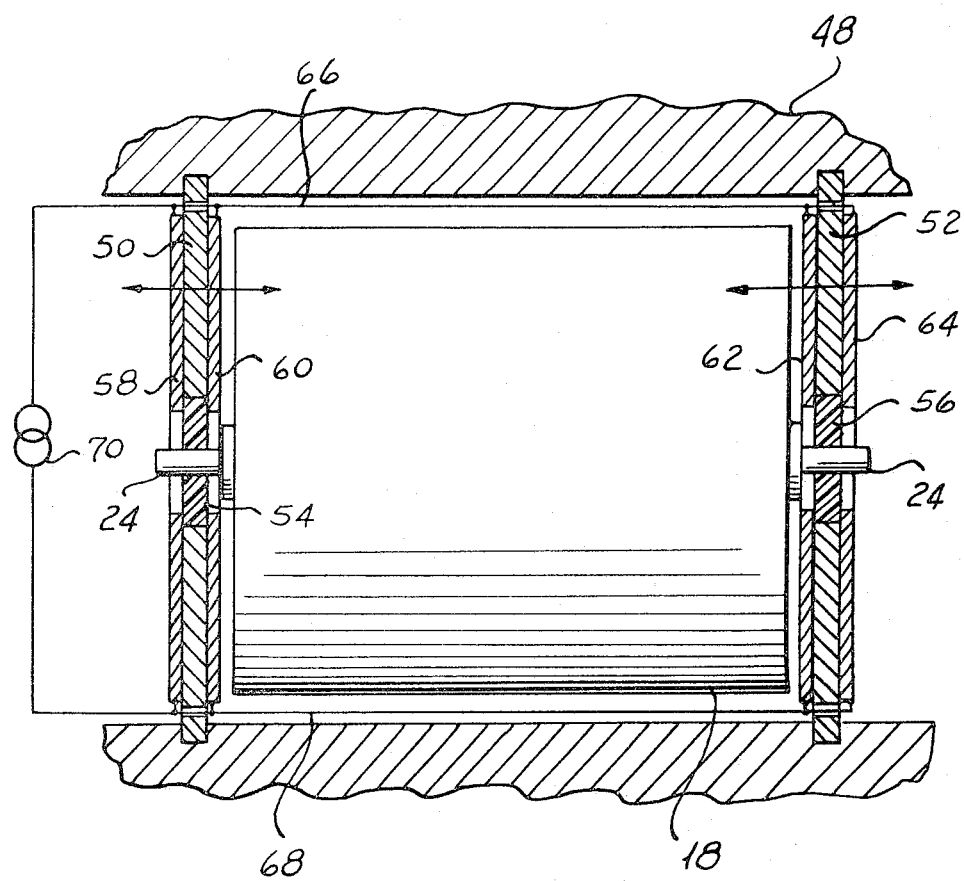

3,304,132
LOW FRICTION BEARING
John E. Broeze, Norwalk, Conn., William J. Laubendorfer, Alamogordo, N. Mex., and David W. Bott, Beverly, Mass., assignors to United Aircraft Corporation, East Hartford, Conn., a corporation of Delaware
Original application Oct. 20, 1961, Ser. No. 146,509. Divided and this application Dec. 18, 1964, Ser. No. 435,764
3 Claims. (Cl. 308—1)

This application is a division of our copending application Serial No. 146,509, filed October 20, 1961.

Our invention relates to a low friction bearing and more particularly to an improved bearing, for use on sensitive instruments, in which the effect of static friction is reduced.

The accuracy of many sensitive instruments such, for example, as floated gyros, floated pendulous integrating and non-integrating accelerometers and the like is deleteriously affected by the presence of static friction in the pivot-and-jewel bearings which support the sensitive element of the instrument.

It has been suggested in the prior art that the effect of static friction on a bearing could be reduced by producing constant relative movement between elements of the bearing. For example, one ring of a ball bearing has been continuously oscillated or rotated with respect to the other ring of the bearing to overcome the effect of static friction. Various systems for producing this relative motion have been suggested. In some cases a motor driven linkage is actuated to produce relative motion. In other devices an electromagnetic drive motor has been employed to produce the movement.

All of the systems of the prior art for overcoming the effect of static friction have the inherent defect that they are heavy and cumbersome for the result achieved thereby. In applications such as on missiles and the like where size and weight are primary considerations these static friction reducing systems of the prior art have not proved to be practicable.

We have invented a low friction bearing in which the effect of static friction is overcome by reciprocating the bearing elements with respect to each other along the axis of rotation of the bearing. Our low friction bearing is extremely small and light for the result achieved. It is especially adapted for use on sensitive instruments employing pivot-and-jewel bearings. It is particularly useful in reducing undesirable effects of the cross-coupling acceleration associated with the floated pendulous accelerometer. Our bearing has the added effect of enhancing the lubrication of bearings in instruments in which the bearing is immersed in a liquid.

One object of our invention is to provide a low friction bearing in which the effect of static friction on the bearing characteristic is overcome.

A further object of our invention is to provide a low friction bearing which overcomes the defects of bearings of the prior art provided with means for reducing the effect of static friction.

Another object of our invention is to provide a low friction bearing which is especially adapted for use on sensitive instruments employing pivot-and-jewel bearings.

Still another object of our invention is to provide a low friction bearing which is extremely compact and light for the result achieved thereby.

A still further object of our invention is to provide a low friction bearing which enhances lubrication in an installation in which the bearing is immersed in a liquid.

Other and further objects of our invention will appear from the following description.

In general our invention contemplates the provision of a low friction bearing in which alternating current is applied to a bearing support formed of piezoelectric material to reciprocate the bearing jewel with reference to the pivot of the sensitive element of an instrument to reduce the effect of static friction on the instrument output. In use in an installation in which our bearing is immersed in a liquid it produces a pumping action which forces the liquid into the space between the jewel and the pivot.

In the accompanying drawing which forms a part of the instant specification and which is to be read in conjunction therewith, the figure is a sectional view of one form of our low friction bearing.

Our invention is especially adapted for use in supporting an element such, for example, as a gyroscope float or rotor 18 including shafts or pivot pins 24. In the particular form of our invention shown in the figure the rotor 18 having the shafts 24 is carried by a frame 48. Frame 48 receives respective support plates 50 and 52 which receive bearings 54 and 56 in which we dispose shafts 24.

Plate 50 carries respective annular piezoelectric elements 58 and 60 while plate 52 carries elements 62 and 64. Respective conductors 66 and 68 connect a source 70 of alternating current voltage to the elements 58, 60, 62, and 64. As is known in the art, if a suitable electrical potential is applied to piezoelectric material, a strain results to change the dimensions of the material. We so polarize the elements 58 and 60 and 62 and 64 as to change dimensions in response to an electrical signal that the supports 50 and 52 are distorted to oscillate bearings 54 and 56 in the direction of the axes of the shafts 24. In response to the application of this voltage the elements reciprocate or vibrate the bearings 54 and 56 in a direction along the axis of shafts 24.

In operation of the form of our low friction bearing shown in the drawing wherein the shafts or pins 24 support a gyroscope float 18 in bearings 54 and 56 carried by the plates or discs 50 and 52, the deposits or elements 58, 60, 62 and 64 are so polarized that in response to the application of an electrical signal such as that supplied by the source 70 of alternating current, the elements produce a strain in the plates 50 and 52 which causes them to oscillate the bearings 54 and 56 in the direction of the axis of the rotor 18 as indicated by the arrows in the figure. This operation reduces static friction of the assembly to a point at which it is substantially negligible. Owing to that fact, the assembly is more sensitive than are those of the prior art.

It will be seen that we have accomplished the objects of our invention. We have invented a bearing in which the effect of static friction is negligible. Our bearing overcomes the defects of bearings of the prior art designed to overcome the effect of static friction. Our improved bearing is simple and compact for the result achieved. It is particularly useful in reducing the undesirable effects of cross-coupling acceleration associated with floated pendulous accelerometers. Where it is used in an instrument having a float sensitive element, it enhances the lubrication of the bearings which support the sensitive element.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:
1. A low friction bearing assembly including in combination, a stationary support, a disc carried by said sup- port, a bearing element mounted on said disc, a shaft supported on said bearing element for rotary movement around an axis, an annular region of piezoelectric material on said disc surrounding said axis and means for applying an alternating voltage to said piezoelectric material to reciprocate said bearing in the direction of said axis.

2. A low friction bearing assembly as in claim 1 including a second annular region of piezoelectric material on said disc surrounding said axis and means for applying an alternating voltage to said second annular region.

3. A low friction bearing assembly including in combination, a stationary support, spaced discs carried by said support, respective bearing elements mounted on said discs, a member supported by said bearing elements for rotary movement around an axis, respective annular regions of piezoelectric material on the opposite faces of each of said discs, said regions surrounding said axis and means for applying an alternating voltage to said regions to reciprocate said bearings in the direction of said axis.

References Cited by the Examiner
UNITED STATES PATENTS

| | | | |
|---|---|---|---|
| 2,044,000 | 6/1936 | Heising | 310—8.7 |
| 3,018,142 | 1/1962 | Wornock | 75—5 |
| 3,046,795 | 7/1962 | Wilkerson | 74—5 |

MARTIN P. SCHWADRON, *Primary Examiner.*

FRANK SUSKO, DAVID J. WILLIAMOWSKY,
*Examiners.*